United States Patent
Liu et al.

(10) Patent No.: US 9,652,094 B2
(45) Date of Patent: May 16, 2017

(54) IN CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN); Weijie Zhao, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 35 days.

(21) Appl. No.: 14/434,957

(22) PCT Filed: Mar. 26, 2014

(86) PCT No.: PCT/CN2014/074138
§ 371 (c)(1),
(2) Date: Apr. 10, 2015

(87) PCT Pub. No.: WO2015/123911
PCT Pub. Date: Aug. 27, 2015

(65) Prior Publication Data
US 2016/0026289 A1 Jan. 28, 2016

(30) Foreign Application Priority Data
Feb. 24, 2014 (CN) .......................... 2014 1 0062461

(51) Int. Cl.
*G06F 3/045* (2006.01)
*G06F 3/041* (2006.01)
(Continued)

(52) U.S. Cl.
CPC ............ *G06F 3/044* (2013.01); *G06F 3/0412* (2013.01); *G09G 3/2003* (2013.01); *G09G 3/36* (2013.01);
(Continued)

(58) Field of Classification Search
CPC ..... G06F 3/044; G06F 3/0412; G02F 1/13338
(Continued)

(56) References Cited

U.S. PATENT DOCUMENTS

2010/0110040 A1 5/2010 Kim et al.
2012/0050219 A1 3/2012 Lee et al.
(Continued)

FOREIGN PATENT DOCUMENTS

CN 201607591 U 10/2010
CN 102221755 A 10/2011
(Continued)

OTHER PUBLICATIONS

International Patent Application No. PCT/CN2014074138; Written Opinion and Search Report; dated Dec. 2, 2014; 14 pages.
(Continued)

*Primary Examiner* — Amit Chatly
(74) *Attorney, Agent, or Firm* — Brooks Kushman P.C.

(57) ABSTRACT

The present disclosure provides an in cell touch panel and a display device. An entire common electrode layer on an array substrate is divided so as to form a plurality of touch driving electrodes and a plurality of common electrodes which are insulated from each other and arranged in a crisscross manner. Each touch driving electrode includes a plurality of touch driving sub-electrodes, and each touch driving sub-electrode is arranged between the adjacent common electrodes. Each common electrode includes a plurality of common sub-electrodes. Touch sensing electrodes are arranged on an opposite substrate, and a projection of each
(Continued)

touch sensing electrode onto the array substrate is located at a region where the common electrode is located. The touch driving electrodes are driven in a time-division manner, so as to achieve a touch function and a display function.

20 Claims, 5 Drawing Sheets (51) Int. Cl.
    *G06F 3/044*     (2006.01)
    *G09G 3/20*     (2006.01)
    *G09G 3/36*     (2006.01)

(52) U.S. Cl.
    CPC ........... *G09G 2300/0426* (2013.01); *G09G 2310/0208* (2013.01); *G09G 2310/08* (2013.01); *G09G 2320/0233* (2013.01)

(58) Field of Classification Search
    USPC .................................................. 345/173–179
    See application file for complete search history.

(56) References Cited

U.S. PATENT DOCUMENTS

| | | | | |
|---|---|---|---|---|
| 2012/0274603 A1* | 11/2012 | Kim | ............ | G06F 3/0412 345/174 |
| 2013/0314371 A1* | 11/2013 | Lee | ............ | G06F 3/0412 345/174 |
| 2014/0118642 A1* | 5/2014 | Wang | ............ | G02F 1/13338 349/12 |
| 2014/0247402 A1* | 9/2014 | Chou | ............ | G02F 1/13338 349/12 |
| 2014/0306916 A1 | 10/2014 | Wang et al. | | |
| 2014/0320767 A1 | 10/2014 | Xu et al. | | |
| 2015/0309630 A1 | 10/2015 | Yang et al. | | |
| 2016/0026290 A1* | 1/2016 | Liu | ............ | G06F 3/0412 345/174 |

FOREIGN PATENT DOCUMENTS

| | | |
|---|---|---|
| CN | 103049157 A | 4/2013 |
| CN | 202948433 U | 5/2013 |
| CN | 103150070 A | 6/2013 |
| CN | 103218097 A | 7/2013 |
| CN | 203178998 U | 9/2013 |
| CN | 203706178 U | 7/2014 |
| EP | 2 477 102 A2 | 7/2012 |
| TW | 201209687 A | 3/2012 |

OTHER PUBLICATIONS

China Patent Application No. 2014100624611; Office Action; dated Mar. 21, 2016; 12 pages.

Office Action in Chinese Patent Application No. 201410062461.1, dated Sep. 6, 2016.

International Search Report and Written Opinion in PCT International Application No. PCT/CN2014/074154, dated Dec. 3, 2014.

* cited by examiner

IN CELL TOUCH PANEL AND DISPLAY DEVICE

CROSS-REFERENCE TO RELATED APPLICATIONS

This application is the U.S. National Phase of International Patent Application No. PCT/CN2014/074138, filed Mar. 26, 2014 and claims priority to Chinese Patent Application No. 201410062461.1, filed Feb. 24, 2014, the disclosures of which are incorporated herein by reference in their entirety.

TECHNICAL FIELD

The present disclosure relates to the field of touch technology, in particular to an in cell touch panel and a display device.

BACKGROUND

Along with the rapid development of the display technology, touch panel has been widely used in our daily lives. Currently, depending on its structure, the touch panel may include an add on mode touch panel, an on cell touch panel and an in cell touch panel. For the add on mode touch panel, the touch panel and a liquid crystal display (LCD) panel are produced separately, and then attached together so as to form the LCD panel having a touch function. However, there exist for the add on mode touch panel such drawbacks as high manufacture cost, low light transmittance and thick module. For the in cell touch panel, a touch electrode of the touch panel is built in the LCD panel so as to reduce a thickness of the entire module and remarkably reduce its manufacture cost, so it has attracted more and more attentions from manufacturers.

Recently, liquid crystal display technologies capable of achieving a wide viewing angle mainly include an in-plane switch (IPS) technology and an advanced super dimension switch (ADS) technology. For the ADS technology, a multi dimensional electric field is formed by means of electrical fields generated at edges of slit electrodes within an identical plane and an electrical field generated between a slit electrode layer and a plate electrode layer, so as to enable all the liquid crystal molecules between the slit electrodes and right above the electrodes within a liquid crystal cell to rotate, thereby to improve the operational efficiency of liquid crystal molecules and enhance the light transmission efficiency. The ADS technology may be used to improve the image quality of a TFT-LCD product, and has such advantages as high resolution, high transmittance, low power consumption, wide viewing angle, high aperture ratio, low chromatic aberration and free of push Mura. H-ADS (high aperture ratio-ADS) technology is an important part of the ADS technology.

For the in cell touch panel based on the ADS technology and the H-ADS technology, a common electrode layer on the array substrate is divided into touch driving electrodes and common electrodes insulated from each other and arranged in a crisscross manner, and touch sensing electrodes are arranged on an opposite substrate at positions corresponding to regions where the common electrodes are located. The touch driving electrodes are driven in a time-division manner, so as to achieve a touch function and a display function. In the in cell touch panel, a projection of the touch sensing electrode onto the array substrate is located at the region where the common electrode is located, and the common electrodes and the touch driving electrodes are located at an identical layer and insulated from each other. In this way, it is able to prevent the touch sensing electrode and the touch driving electrode from overlapping each other in the projection direction and reduce a mutual capacitance formed by the overlapping area, thereby to increase the proportion of the mutual capacitance variation when a touch is made by a finger and improve the touch accuracy.

Figure 1:
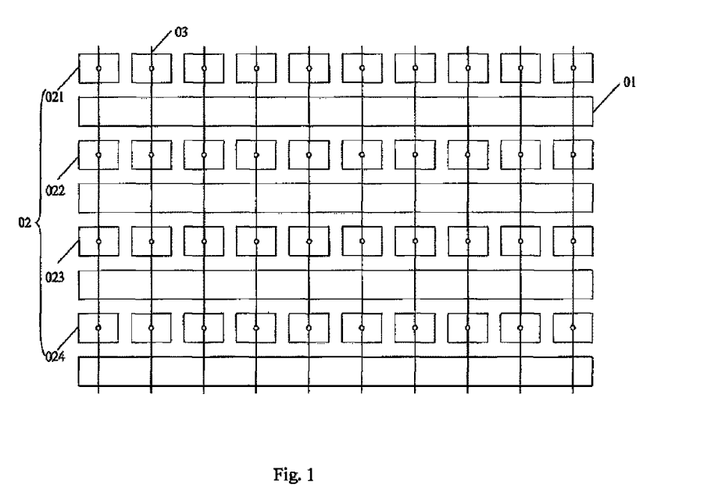
FIG. 1 is a schematic view showing a common electrode layer of an existing in cell touch panel.

In the in cell touch panel, as shown in FIG. 1, which is a schematic view showing the divided common electrode layer, each common electrode 01 is a bar-like electrode, and each touch driving electrode 02 consists of a plurality of touch driving sub-electrodes 021, 022, 023, 024 arranged in an identical column. Each of the touch driving sub-electrodes 021, 022, 023 and 024 is arranged between the adjacent common electrodes 01. The touch driving sub-electrodes 021, 022, 023 and 024 belonging to the same touch driving electrode 02 and arranged at both sides of the common electrodes 01 are electrically connected to each other via a touch driving signal line 03. When it is required to achieve the display function, a common electrode signal is applied to the common electrodes 01 and the touch driving electrodes 02 simultaneously. However, because each touch driving electrode 02 consists of a plurality of separate touch driving sub-electrodes 021, 022, 023 and 024 while the common electrode 01 is a bar-like electrode, a signal transmission load of the touch driving electrode 02 is different from that of the common electrode 01, and the common electrode signal is transmitted in the common electrode 01 at a speed different from in the touch driving electrode 02. As a result, an uneven display image will occur and the image quality will be adversely affected.

SUMMARY

An object of the present disclosure is to provide an in cell touch panel and a display device, so as to prevent the occurrence of uneven display due to different loads of a touch driving electrode and a common electrode in an existing in cell touch panel.

In one aspect, the present disclosure provides in one embodiment an in cell touch panel, including an array substrate having a common electrode layer, and an opposite substrate arranged opposite to the array substrate. The common electrode layer of the array substrate includes a plurality of touch driving electrodes and a plurality of common electrodes. The touch driving electrodes and the common electrodes are insulated from each other and arranged in a crisscross manner. Each touch driving electrode includes a plurality of touch driving sub-electrodes arranged in an extension direction of the touch driving electrode, and each touch driving sub-electrode is arranged between the adjacent common electrodes. Each common electrode includes a plurality of common sub-electrodes arranged in an extension direction of the common electrode. Within a display period of one frame, a common electrode signal and a touch scanning signal are applied to the touch driving electrode in a time-sharing manner, and the common electrode signal is applied to the common electrode. A plurality of touch sensing electrodes is arranged on the opposite substrate, and an orthographic projection of each touch sensing electrode onto the array substrate is located at a region where the common electrode is located.

According to the in cell touch panel in the embodiment of the present disclosure, the entire common electrode layer on the array substrate is divided so as to form a plurality of touch driving electrodes and a plurality of common electrodes which are insulated from each other and arranged in a crisscross manner. Each touch driving electrode includes a plurality of touch driving sub-electrodes arranged in the extension direction of the touch driving electrode, and each touch driving sub-electrode is arranged between the adjacent common electrodes. Each common electrode includes a plurality of common sub-electrodes arranged in the extension direction of the common electrode. The touch sensing electrodes are arranged on the opposite substrate, and the projection of each touch sensing electrode onto the array substrate is located at the region where the common electrode is located. The touch driving electrodes are driven in a time-division manner, so as to achieve a touch function and a display function. The touch driving electrode Consists of a plurality touch driving sub-electrodes and the common electrode also consists of a plurality of common sub-electrodes, so they have an approximately identical signal transmission load, and at a display stage, the common electrode signal is transmitted in the common electrode at a speed approximately identical to in the touch driving electrode. As a result, it is able to prevent the occurrence of an uneven display image, thereby to improve the image quality.

In an alternative embodiment, each common sub-electrode is of a shape and a size identical to each touch driving sub-electrode.

In an alternative embodiment, a plurality of pixel units are arranged in the in cell touch panel in a matrix form. Each touch driving electrode extends in a row direction of the pixel units, and each touch sensing electrode and each common electrode extend in a column direction of the pixels; or each touch driving electrode extends in the column direction of the pixel units, and each touch sensing electrode and each common electrode extend in the row direction of the pixel units.

In an alternative embodiment, a plurality of touch driving signal lines are arranged on the array substrate, each touch driving signal line is arranged between the adjacent pixel units, and the touch driving sub-electrodes of each touch driving electrode are electrically connected to each other via at least one of the touch driving signal lines.

In an alternative embodiment, a plurality of common electrode signal lines is arranged on the array substrate, and each common electrode signal line are arranged between the adjacent pixel units and electrically connected to the common sub-electrodes which overlap an orthographic projection of the common electrode signal line onto the array substrate.

In an alternative embodiment, the common electrode signal line extends in a direction identical to or perpendicular to the touch driving signal line.

In an alternative embodiment, a black matrix on a base substrate is arranged on the opposite substrate, and each touch sensing electrode is arranged between the base substrate and the black matrix, or on the black matrix.

In an alternative embodiment, each touch sensing electrode is of a grid structure, and an orthographic projection of the grid structure of the touch sensing electrode onto the opposite substrate is located at a region where the black matrix is located.

In an alternative embodiment, the touch sensing electrode is made of a transparent conductive oxide or metal.

In another aspect, the present disclosure provides in one embodiment a display device including the above-mentioned in cell touch panel.

DETAILED DESCRIPTION

The present disclosure will be described hereinafter in conjunction with the drawings and embodiments. A thickness and a shape of each layer in the drawings are for illustrative purposes only, but shall not be used to reflect a real scale.

Figure 2:
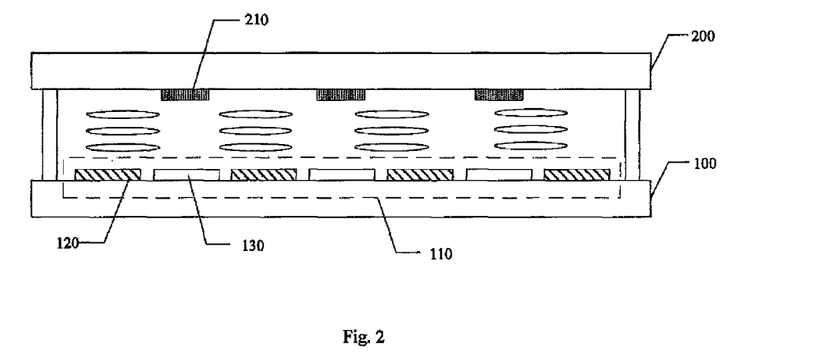
FIG. 2 is a schematic view showing an in cell touch panel according to one embodiment of the present disclosure.

As shown in FIG. 2, which is a sectional view of an in cell touch panel according to one embodiment of the present disclosure, the in cell touch panel includes an array substrate 100 having a common electrode layer 110, and an opposite substrate 200 arranged opposite to the array substrate 100.

Figure 3A:
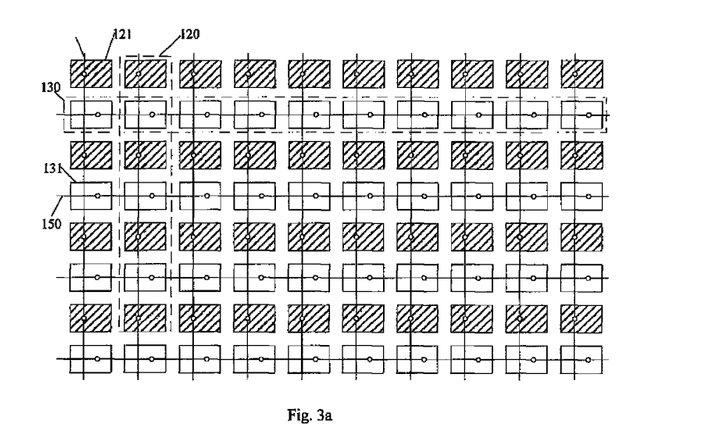
FIGS. 3a and 3b are schematic views showing an array substrate of the in cell touch panel according to one embodiment of the present disclosure.
Figure 3B:
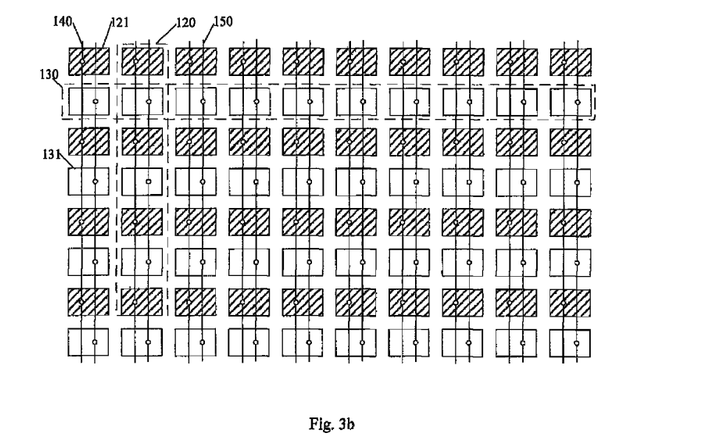

As shown in FIGS. 3a and 3b, the common electrode layer 110 of the array substrate 100 includes a plurality of touch driving electrodes 120 and a plurality of common electrodes 130. The touch driving electrodes 120 and the common electrodes 130 are insulated from each other and arranged in a crisscross manner. Each touch driving electrode 120 includes a plurality of touch driving sub-electrodes 121 arranged in an extension direction of the touch driving electrode 120, and each touch driving sub-electrode 121 is arranged between the adjacent common electrodes 130. Each common electrode 130 includes a plurality of common sub-electrodes 131 arranged in an extension direction of the common electrode 130. Within a display period of one frame, a common electrode signal and a touch scanning signal are applied to the touch driving electrode 120 in a time-division manner, and the common electrode signal is applied to the common electrode 130. A plurality of touch sensing electrodes 210 is arranged on the opposite substrate 200, and an orthographic projection of each touch sensing electrode 210 onto the array substrate 100 is located at a region where the common electrode 130 is located.

According to the in cell touch panel in the embodiment of the present disclosure, the entire common electrode layer on the array substrate is divided so as to form a plurality of touch driving electrodes and a plurality of common electrodes which are insulated from each other and arranged in a crisscross manner. Each touch driving electrode includes a plurality of touch driving sub-electrodes arranged in the extension direction of the touch driving electrode, and each touch driving sub-electrode is arranged between the adjacent common electrodes. Each common electrode includes a plurality of common sub-electrodes arranged in the extension direction of the common electrode. The touch sensing electrodes are arranged on the opposite substrate, and the projection of each touch sensing electrode onto the array substrate is located at the region where the common electrode is located. The touch driving electrodes are driven in a time-division manner, so as to achieve a touch function and a display function. The touch driving electrode consists of a plurality touch driving sub-electrodes and the common electrode also consists of a plurality of common sub-electrodes, so they have an approximately identical signal transmission load, and at a display stage, the common electrode signal is transmitted in the common electrode at a speed approximately identical to in the touch driving electrode. As a result, it is able to prevent the occurrence of an uneven display image, thereby to improve the image quality.

In addition, according to the in cell touch panel in embodiments of the present disclosure, the in cell touch panel is driven at a touch stage and a display stage in a time-division manner. As a result, it is able to, on one hand, reduce the production cost by integrating display driving chip and touch driving chip together, and on the other hand, reduce the mutual interference between the display stage and the touch stage as well as improve the image quality and the touch accuracy.

Figure 5:
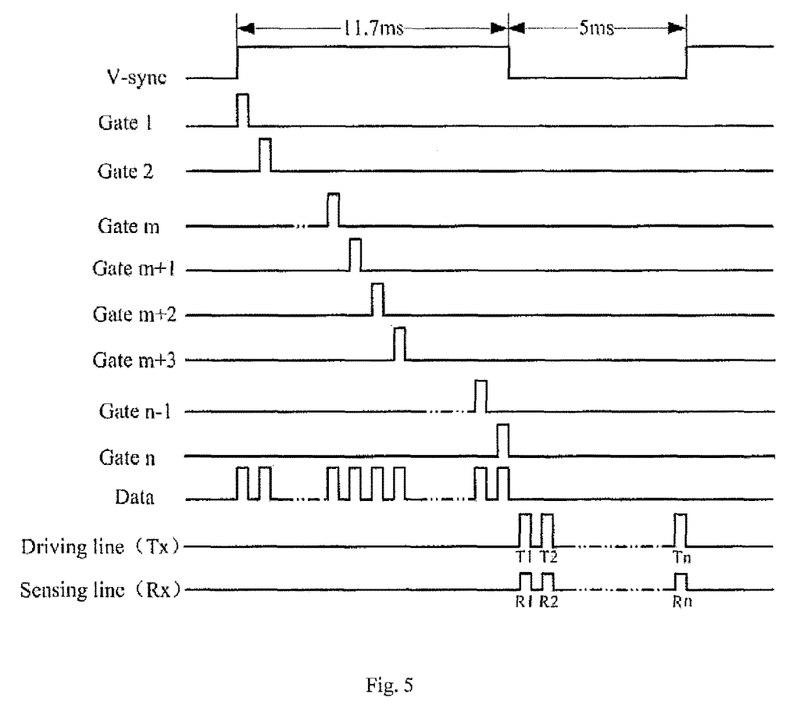
FIG. 5 is a driving sequence diagram of the in cell touch panel according to one embodiment of the present disclosure.

To be specific, in a driving sequence diagram as shown in FIG. 5, a period, e.g., 16.7 ms, for displaying each frame (V-sync) on the in cell touch panel is divided into a display period (Display), e.g., 11.7 ms, and a touch period (Touch), e.g., 5 ms. Of course, the durations of the display period and the touch period may be adjusted appropriately in accordance with a processing capacity of an IC, and they are not particularly defined herein. At the display period, a gate scanning signal is applied to gate signal lines Gate 1, Gate 2, . . . , Gate n of the in cell touch panel in turn, and a grayscale signal is applied to data signal lines Data. At this time, the touch driving electrode TX serves as the common electrode, and a constant common electrode signal is applied to the touch driving electrode Tx via the IC connected to the touch driving electrode Tx, so as to achieve the display function. At the touch period, touch scanning signals T1, T2, . . . , Tn are applied to the touch driving electrodes via the IC connected to the touch driving electrodes, and touch sensing signals R1, R2, . . . , Rn are detected by the touch sensing electrodes, respectively, so as to achieve the touch function. There is no signal applied to each gate signal line and each data signal line of the in cell touch panel at the touch period, and the common electrode signal is always applied to the common electrodes at both the display period and the touch period. Alternatively, the common electrode signal is applied to the common electrodes at the display period, while the common electrodes are grounded or floating (i.e., no signal is applied) at the touch period.

During the implementation, usually the in cell touch panel includes a plurality of pixel units arranged in a matrix form. Alternatively, the touch driving electrode 120 extends in a row direction of the pixel units, and the touch sensing electrode 210 and the common electrode 130 extend in a column direction of the pixel units. Of course, the wiring directions may be changed in accordance with a size of a device, i.e., the touch driving electrode 120 may extend in the column direction of the pixel units, and the touch sensing electrode 210 and the common electrode 130 extend in the row direction of the pixel units.

The following description is given by taking the touch driving electrode 120 extending in the column direction of the pixel units and the touch sensing electrode 210 and the common electrode 130 extending in the row direction of the pixel units as an example.

To be specific, as shown in FIGS. 3a and 3b, a plurality of touch driving signal lines 140 is arranged on the array substrate, each touch driving signal line is arranged between the adjacent pixel units, and the touch driving sub-electrodes 121 of each touch driving electrode 120 are electrically connected to each other via at least one of the touch driving signal lines 140. During the implementation, when the touch driving electrode 120 extends in the row direction of the pixel units, usually the touch driving signal line 140 also extends in the row direction of the pixel units, i.e., the touch driving signal line 140 is located at a gap between the adjacent rows of the pixel units. When the touch driving electrode 120 extends in the column direction of the pixel units, usually the touch driving signal line 140 also extends in the column direction of the pixel units, i.e., the touch driving signal line 140 is located at a gap between the adjacent columns of the pixel units.

During the implementation, when the touch driving signal line 140 extends in the row direction of the pixel units, it may be arranged at a layer identical to the gate signal lines on the array substrate. The touch driving signal line 140 is electrically connected to the corresponding touch driving sub-electrode 121 through at least one via-hole. In this way, it is merely required to, without any additional process, form patterns of the touch driving signal lines 140 and the gate signal lines by a single patterning process. As a result, it is able to reduce the production cost and increase an added value of the product.

During the implementation, when the touch driving signal line 140 extends in the column direction of the pixel units, it may be arranged at a layer identical to the data signal lines on the array substrate. Each touch driving signal line 140 is electrically connected to the corresponding touch driving sub-electrode 121 through at least one via-hole. In this way, it is merely required to, without any additional process, form patterns of the touch driving signal lines 140 and the data signal lines by a single patterning process. As a result, it is able to reduce the production cost and increase an added value of the product.

Further, the common electrode layer is usually made of ITO which has a relatively high resistance. After the touch driving signal line 140 made of metal is electrically connected to the touch driving electrode 120, it is equivalent to that the ITO electrode is connected in parallel to resistors formed by the touch driving signal lines. In this way, it is able to minimize the resistance of the touch driving electrode 120, thereby to improve a signal-to-noise ratio when the signal is transmitted by the electrodes.

To be specific, as shown in FIGS. 3a and 3b, a plurality of common electrode signal lines 150 may be arranged on the array substrate, and each common electrode signal line 150 is arranged between the adjacent pixel units and electrically connected to the common sub-electrodes 131 which overlap an orthographic projection of the common electrode signal line 150 onto the array substrate. During the implementation, each common electrode signal line 150 may extend in the row direction of the pixel units, as shown in FIG. 3a, i.e., the common electrode signal line 150 is located at the gap between the adjacent rows of the pixel units. Of course, as shown in FIG. 3b, each common electrode signal line 150 may also extend in the column direction of the pixel units, i.e., the common electrode signal line 150 is located at the gap between the adjacent columns of the pixel units.

Alternatively, when the common electrode signal line 150 extends in the row direction of the pixel units, it may be arranged at a layer identical to the gate signal lines on the array substrate and electrically connected to the corresponding common electrode 130 through at least one via-hole. When the common electrode signal line 150 extends in the column direction of the pixel units, it may be arranged at a layer identical to the data signal lines on the array substrate and electrically connected to the corresponding common electrode 130 through at least one via-hole. In this way, it is merely required to, without any additional process, form patterns of the common electrode signal lines 150 and the gate signal lines or the data signal lines by a single patterning process. As a result, it is able to reduce the production cost and increase an added value of the product.

Further, the common electrode layer is usually made of ITO which has a relatively high resistance. After the common electrode signal line 150 made of metal is electrically connected to the common electrode 130, it is equivalent to that the ITO electrode is connected in parallel to resistors formed by the common electrode signal lines. In this way, it is able to minimize the resistance of the common electrode, thereby to improve a signal-to-noise ratio when the signal is transmitted by the electrodes.

To be specific, during the implementation, as shown in FIG. 3a, the common electrode signal line 150 extends in a direction perpendicular to the touch driving signal line 140, i.e., the common electrode signal line 150 extends in a direction identical to, and penetrates through, the common electrode 130. Of course, as shown in FIG. 3b, the common electrode signal line 150 may extend in a direction identical to the touch driving signal line 140, i.e., the common electrode signal line 150 extends in a direction perpendicular to the common electrode 130 and penetrates through the corresponding common sub-electrode 131.

During the implementation, the entire common electrode layer on the array substrate is divided into a plurality of common sub-electrodes 131, and each common sub-electrode 131 is of a shape and a size identical to the touch driving sub-electrode 121. In this way, when the touch driving signal line 140 extends in a direction identical to the common electrode signal line 150, the number of the touch driving sub-electrodes 121 connected to each touch driving signal line 140 is identical to the number of the common sub-electrodes 131 connected to each common electrode 150. At this time, the signal transmission load of the touch driving signal line 140 is approximately identical to that of the common electrode signal line 150, and at the display stage, the common electrode signal is transmitted in the common electrode signal line 150 at a speed approximately identical to in the touch driving signal line 140. As a result, it is able to prevent the occurrence of an uneven display image, thereby to improve the image quality.

During the implementation, usually a black matrix on a base substrate is arranged on the opposite substrate, and the touch sensing electrode 210 may be arranged between the base substrate and the black matrix, or on the black matrix.

To be specific, the touch sensing electrode 210 is located at a position corresponding to the common electrode 130, so as to prevent the touch sensing electrode 210 and the touch driving electrode 120 from overlapping to each other in the projection direction. During the implementation, the precision of the touch panel is usually at a millimeter level while the precision of the liquid crystal display panel is usually at a micron level, i.e., the precision desired for display is far greater than that desired for touch. Hence, usually each touch sensing electrode 210 and each common electrode 130 correspond to several rows of pixel units. In addition, a gap between the touch sensing electrodes may be set in accordance with the desired touch precision, as long as the projection of the touch sensing electrode 210 onto the array substrate 100 is located at the region where the common electrode 130 is located. A width of the touch sensing electrode 210 is usually not greater than that of the common electrode. There may exist at least one common electrode 130 between the adjacent touch sensing electrodes 210, or the touch sensing electrode 210 is arranged in a one-to-one correspondence with the common electrode 130, which is not particularly defined herein.

Figure 4A:
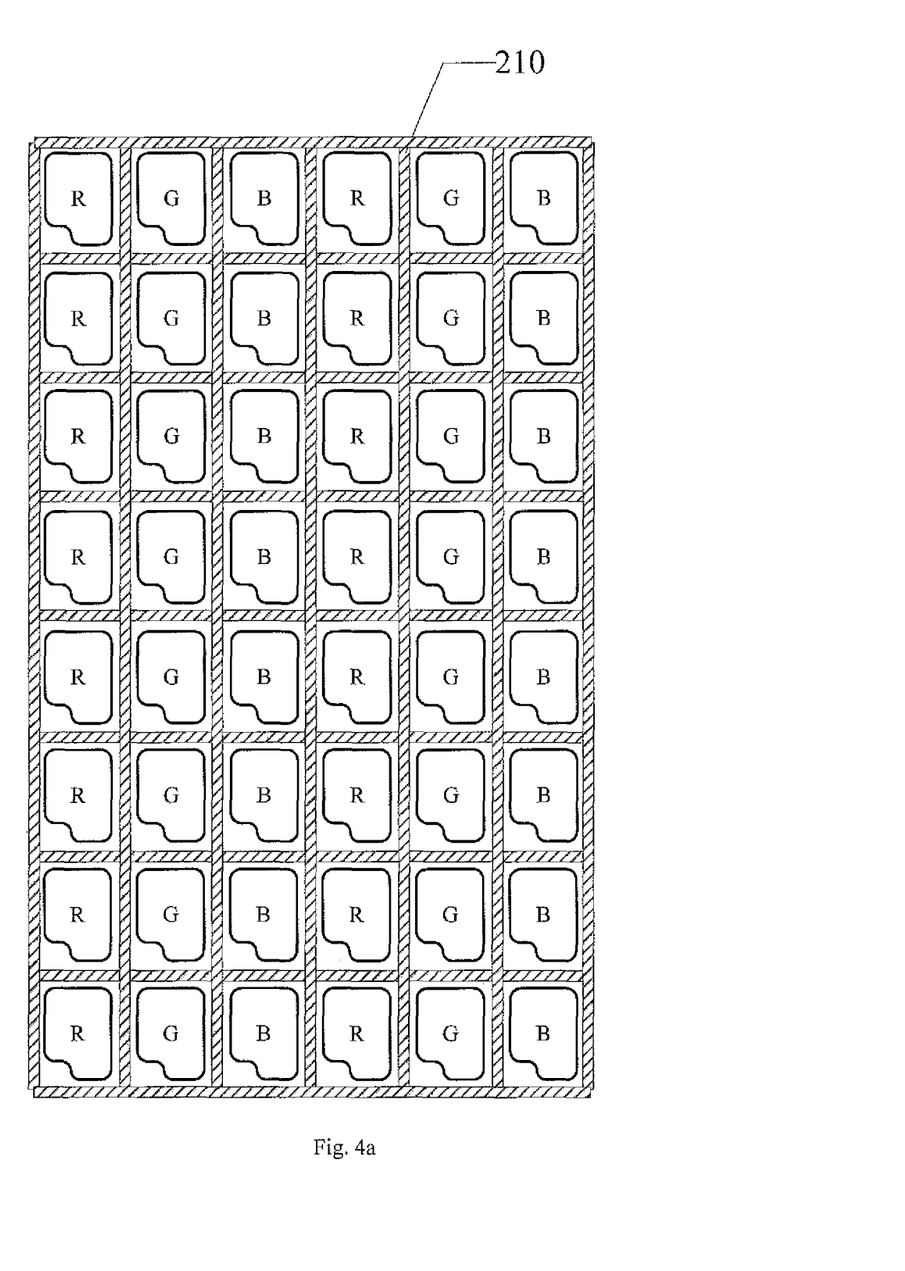
FIGS. 4a and 4b are schematic views showing touch sensing electrodes of the in cell touch panel according to one embodiments of the present disclosure.
Figure 4B:
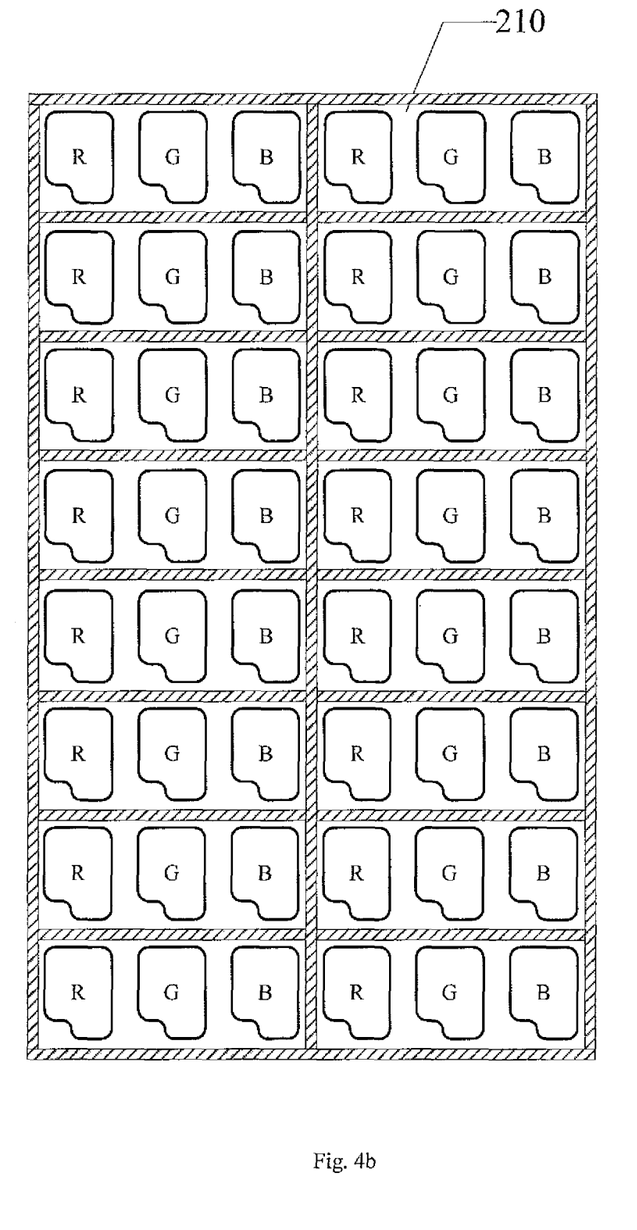

In addition, in order to ensure an aperture ratio of the pixel unit from being adversely affected by the touch sensing electrode 210, usually the touch sensing electrode 120 is of a grid structure, and an orthographic projection of the grid structure of the touch sensing electrode 210 onto the opposite substrate 200 is located at a region where the black matrix is located. In this way, the grid structure of the touch sensing electrode 210 is shielded by the black matrix, and as a result, it is unable to affect the aperture ratio and the light transmittance of the display device. To be specific, a mesh size of the grid structure of the touch sensing electrode 210 may be set in accordance with the practical need. For example, as shown in FIG. 4a, a pattern of the touch sensing electrode 210 may be arranged at a gap between sub-pixel units (RGB) of the pixel unit, or as shown in FIG. 4b, the pattern may be merely arranged at a gap between the pixel units.

To be specific, the pixel unit is not shielded by the touch sensing electrode with the grid structure on the color filter substrate, so the touch sensing electrode may be made of a transparent conductive oxide, e.g., ITO or IZO, or metal. When the touch sensing electrode is made of metal, it is able to reduce its resistance effectively.

Based on the same inventive concept, the present disclosure further provides in one embodiment a display device including the above-mentioned in cell touch panel. The display device may be any product or member having a display function, e.g., a mobile phone, a flat-panel PC, a TV, a display, a laptop PC, a digital photo frame and a navigator. The implementation of the display device may refer to the above embodiments, and thus will not be repeated herein.

According to the in cell touch panel and the display device in the embodiments of the present disclosure, the entire common electrode layer on the array substrate is divided so as to form a plurality of touch driving electrodes and a plurality of common electrodes which are insulated from each other and arranged in a crisscross manner. Each touch driving electrode includes a plurality of touch driving sub-electrodes arranged in the extension direction of the touch driving electrode, and each touch driving sub-electrode is arranged between the adjacent common electrodes. Each common electrode includes a plurality of common sub-electrodes arranged in the extension direction of the common electrode. The touch sensing electrodes are arranged on the opposite substrate, and the projection of each touch sensing electrode onto the array substrate is located at the region where the common electrode is located. The touch driving electrodes are driven in a time-division manner, so as to achieve the touch function and the display function. The touch driving electrode consists of a plurality touch driving sub-electrodes and the common electrode also consists of a plurality of common sub-electrodes, so they have an approximately identical signal transmission load, and at a display stage, the common electrode signal is transmitted in the common electrode at a speed approximately identical to in the touch driving electrode. As a result, it is able to prevent the occurrence of an uneven display image, thereby to improve the image quality.

The above are merely the preferred embodiments of the present disclosure. Obviously, a person skilled in the art may make further modifications and improvements without departing from the spirit of the present disclosure. If these modifications and improvements fall within the scope of the appended claims and the equivalents thereof, the present disclosure also intends to include them.

What is claimed is:

1. An in cell touch panel, comprising an array substrate having a common electrode layer, and an opposite substrate arranged opposite to the array substrate, wherein
   the common electrode layer of the array substrate comprises a plurality of touch driving electrodes and a plurality of common electrodes, and the touch driving electrodes and the common electrodes are insulated from each other and arranged in a crisscross manner;
   each touch driving electrode comprises a plurality of touch driving sub-electrodes arranged in an extension direction of the touch driving electrode, and each touch driving sub-electrode is arranged between the adjacent common electrodes;
   each common electrode comprises a plurality of common sub-electrodes arranged in an extension direction of the common electrode; and
   a plurality of touch sensing electrodes is arranged on the opposite substrate, and an orthographic projection of each touch sensing electrode onto the array substrate is fully covered by an orthographic projection of the common electrode onto the array substrate.

2. The in cell touch panel according to claim 1, wherein each common sub-electrode is of a shape and a size identical to each touch driving sub-electrode.

3. The in cell touch panel according to claim 1, wherein a plurality of pixel units are arranged in the in cell touch panel in a matrix form, and
   each touch driving electrode extends in a row direction of the pixel units, and each touch sensing electrode and each common electrode extend in a column direction of the pixel units; or each touch driving electrode extends in the column direction of the pixel units, and each touch sensing electrode and each common electrode extend in the row direction of the pixel units.

4. The in cell touch panel according to claim 3, wherein a plurality of touch driving signal lines are arranged on the array substrate, each touch driving signal line is arranged between the adjacent pixel units, and the touch driving sub-electrodes of each touch driving electrode are electrically connected to each other via at least one of the touch driving signal lines.

5. The in cell touch panel according to claim 3, wherein a plurality of common electrode signal lines are arranged on the array substrate, and each common electrode signal line is arranged between the adjacent pixel units and electrically connected to the common sub-electrodes which overlap an orthographic projection of the common electrode signal line onto the array substrate.

6. The in cell touch panel according to claim 5, wherein the common electrode signal line extends in a direction identical to or perpendicular to the touch driving signal line.

7. The in cell touch panel according to claim 1, wherein a black matrix on a base substrate is arranged on the opposite substrate, and each touch sensing electrode is arranged between the base substrate and the black matrix, or on the black matrix.

8. The in cell touch panel according to claim 7, wherein each touch sensing electrode is of a grid structure, and an orthographic projection of the grid structure of the touch sensing electrode onto the opposite substrate is located at a region where the black matrix is located.

9. The in cell touch panel according to claim 1, wherein the touch sensing electrode is made of a transparent conductive oxide or metal.

10. A display device comprising:
    an in cell touch panel, the in cell touch panel comprising an array substrate having a common electrode layer, and an opposite substrate arranged opposite to the array substrate, wherein
    the common electrode layer of the array substrate comprises a plurality of touch driving electrodes and a plurality of common electrodes, and the touch driving electrodes and the common electrodes are insulated from each other and arranged in a crisscross manner;
    each touch driving electrode comprises a plurality of touch driving sub-electrodes arranged in an extension direction of the touch driving electrode, and each touch driving sub-electrode is arranged between the adjacent common electrodes;
    each common electrode comprises a plurality of common sub-electrodes arranged in an extension direction of the common electrode; and
    a plurality of touch sensing electrodes is arranged on the opposite substrate, and an orthographic projection of each touch sensing electrode onto the array substrate is fully covered by an orthographic projection of the common electrode onto the array substrate.

11. The display device according to claim 10, wherein each common sub-electrode is of a shape and a size identical to each touch driving sub-electrode.

12. The display device according to claim 10, wherein a plurality of pixel units are arranged in the in cell touch panel in a matrix form, and
    each touch driving electrode extends in a row direction of the pixel units, and each touch sensing electrode and each common electrode extend in a column direction of the pixel units; or each touch driving electrode extends in the column direction of the pixel units, and each touch sensing electrode and each common electrode extend in the row direction of the pixel units.

13. The display device according to claim 12, wherein a plurality of touch driving signal lines are arranged on the array substrate, each touch driving signal line is arranged between the adjacent pixel units, and the touch driving sub-electrodes of each touch driving electrode are electrically connected to each other via at least one of the touch driving signal lines.

14. The display device according to claim 12, wherein a plurality of common electrode signal lines are arranged on the array substrate, and each common electrode signal line is arranged between the adjacent pixel units and electrically connected to the common sub-electrodes which overlap an orthographic projection of the common electrode signal line onto the array substrate.

15. The display device according to claim 14, wherein the common electrode signal line extends in a direction identical to or perpendicular to the touch driving signal line.

16. The display device according to claim 10, wherein a black matrix on a base substrate is arranged on the opposite substrate, and each touch sensing electrode is arranged between the base substrate and the black matrix, or on the black matrix.

17. The display device according to claim 16, wherein each touch sensing electrode is of a grid structure, and an orthographic projection of the grid structure of the touch sensing electrode onto the opposite substrate is located at a region where the black matrix is located.

18. The display device according to claim 10, wherein the touch sensing electrode is made of a transparent conductive oxide or metal.

19. The in cell touch panel according to claim 2, wherein a plurality of pixel units are arranged in the in cell touch panel in a matrix form, and each touch driving electrode extends in a row direction of the pixel units, and each touch sensing electrode and each common electrode extend in a column direction of the pixel units; or each touch driving electrode extends in the column direction of the pixel units, and each touch sensing electrode and each common electrode extend in the row direction of the pixel units.

20. An in cell touch panel, comprising an array substrate having a common electrode layer, and an opposite substrate arranged opposite to the array substrate, wherein the common electrode Layer of the array substrate comprises a plurality of touch driving electrodes and a plurality of common electrodes, and the touch driving electrodes and the common electrodes are insulated from each other and arranged in a crisscross manner;

each touch driving electrode comprises a plurality of touch driving sub-electrodes arranged in an extension direction of the touch driving electrode, and each touch driving sub-electrode is arranged between the adjacent common electrodes;

each common electrode comprises a plurality of common sub-electrodes arranged in an extension direction of the common electrode; and a plurality of touch sensing electrodes is arranged on the opposite substrate, and each touch sensing electrode is located at a position corresponding to the common electrode, a width of the touch sensing electrode is not greater than a width of the common electrode.

* * * * *

UNITED STATES PATENT AND TRADEMARK OFFICE
CERTIFICATE OF CORRECTION

PATENT NO. : 9,652,094 B2
APPLICATION NO. : 14/434957
DATED : May 16, 2017
INVENTOR(S) : Yingming Liu et al.

It is certified that error appears in the above-identified patent and that said Letters Patent is hereby corrected as shown below:

In the Claims

Column 11, Line 13, Claim 20:
After "the common electrode"
Delete "Layer" and
Insert -- layer --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*